United States Patent [19]

Hufnagel

[11] Patent Number: 4,863,148
[45] Date of Patent: Sep. 5, 1989

[54] APPARATUS FOR ADJUSTMENT OF AUTOMOBILE TORSION BAR SUSPENSION ASSEMBLY

[76] Inventor: Douglas G. Hufnagel, 20460 Der Kinder Rd., Redding, Calif. 96003

[21] Appl. No.: 113,629

[22] Filed: Oct. 27, 1987

[51] Int. Cl.$^4$ .................. B60G 11/18; F16F 1/14
[52] U.S. Cl. .................. 267/278; 267/283; 267/284; 267/285; 267/154; 280/721; 280/695
[58] Field of Search ............... 267/273–285, 267/154–157, 188, 191; 280/695, 700, 717, 721–723; 403/4, 2, 300, 359, 11, 224, 83–85, 109, 277, 278, 111, 397; 16/299, 308

[56] References Cited

U.S. PATENT DOCUMENTS

| | | | |
|---|---|---|---|
| 2,163,131 | 6/1939 | Porsche | 267/277 |
| 2,175,562 | 10/1939 | Frohlich | 267/278 |
| 2,453,116 | 11/1948 | Buckendale | 267/278 |
| 2,590,711 | 3/1952 | Krotz | 267/278 |
| 2,606,759 | 8/1952 | Colby | 267/284 |
| 2,624,568 | 1/1953 | Kany | 267/278 |
| 3,183,018 | 5/1965 | Holmstrom | 267/273 X |
| 3,207,497 | 9/1965 | Schoonover | 267/283 |
| 3,432,158 | 3/1969 | Goodwin | 267/278 |
| 3,554,616 | 1/1971 | Litvinov | 267/273 X |
| 4,094,532 | 6/1978 | Johnson et al. | 267/284 X |
| 4,152,011 | 5/1979 | Sano et al. | 267/278 X |
| 4,194,761 | 3/1980 | Falk et al. | 267/284 X |
| 4,243,247 | 1/1981 | Kataoka | 280/721 X |
| 4,589,164 | 5/1986 | Leonard | 403/397 X |
| 4,621,391 | 11/1986 | Leonard | 267/154 X |
| 4,723,790 | 2/1988 | Wharton | 280/721 X |

Primary Examiner—Douglas C. Butler
Attorney, Agent, or Firm—Howard Cohen

[57] ABSTRACT

A system for enabling modification and adjustment of an automobile torsion bar suspension assembly housed in a tubular beam housing includes a plurality of torsion spring stiffener members, each comprising a tubular member dimensioned to be slidably received about the torsion leaf spring assembly within the beam housing. The tubular member includes opposed end portions provided with an inner peripheral surface formed complementary to the outer surface conformation of the leaves of the torsion bar assembly and adapted to engage the leaves assembly in nonrotating fashion. The stiffener member acts to rotationally immobilize a segment of the length of the torsion leaf assembly, thereby increasing the stiffness of the torsion spring. The invention also includes a socket tool having a recess in one end formed in complementary fashion to the outer surface conformation of the torsion leaf assembly and adapted to be engaged thereon. The other end of the socket tool is provided with a receptacle adapted to receive a standard drive lug of a torque wrench. A partial circumferential slot is provided in the beam housing adjacent to the internal block, and a pair of toothed locking plates are welded to the beam housing adjacent to the slot. A mounting screw secured to the internal block extends through the slot, and a top plate is secured to the screw. The top plate includes complementary teeth to enable rigid mounting of the internal block and torsion leaf assembly at variable angles with respect to the beam housing, thus selectively setting the height of the auto suspension.

10 Claims, 4 Drawing Sheets

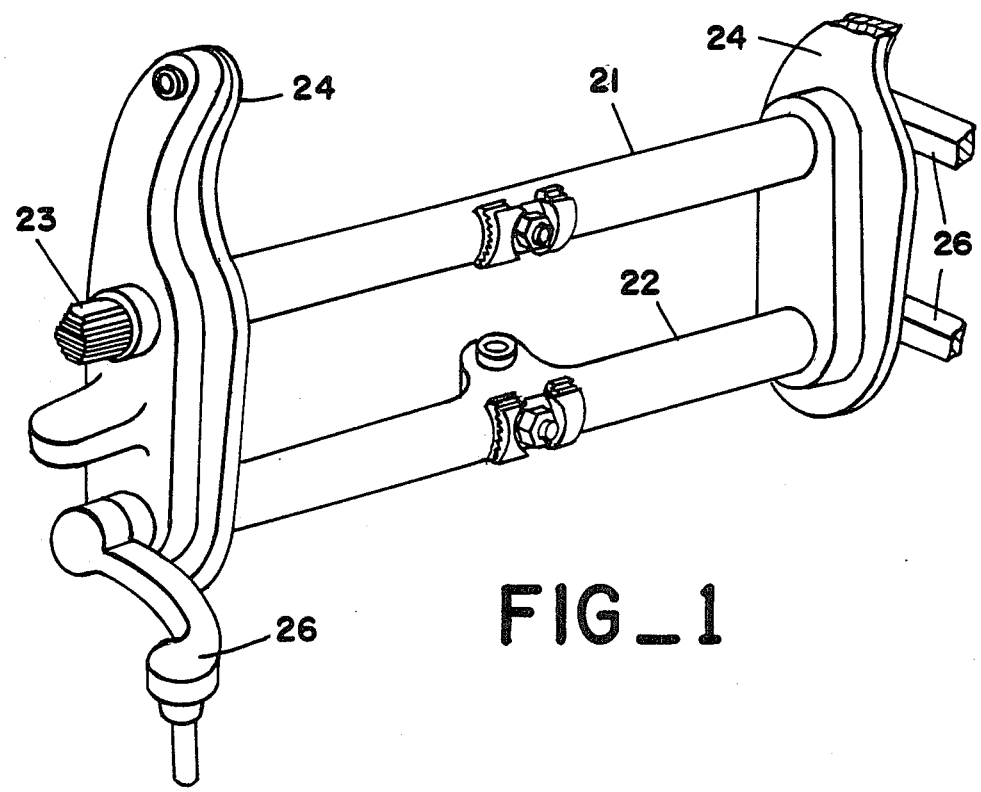
FIG_1
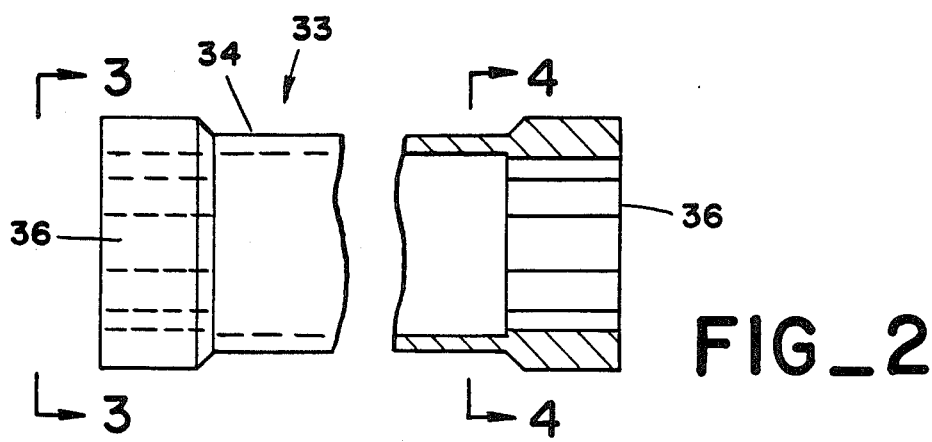
FIG_2
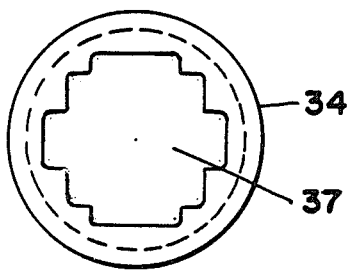
FIG_3
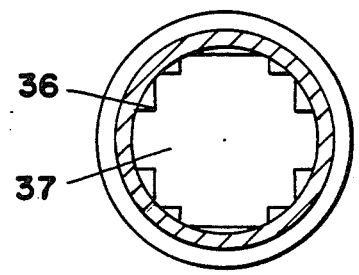
FIG_4

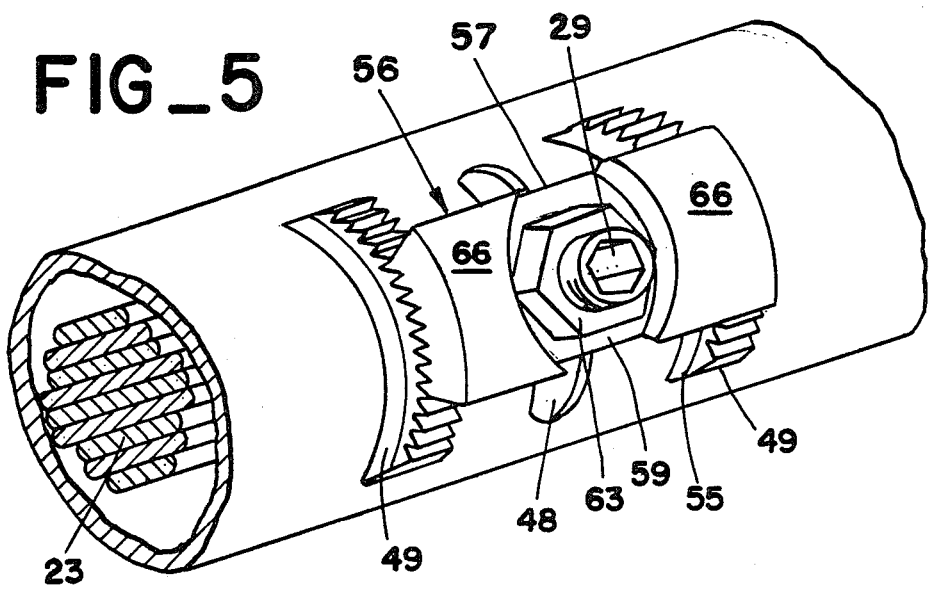
FIG_5
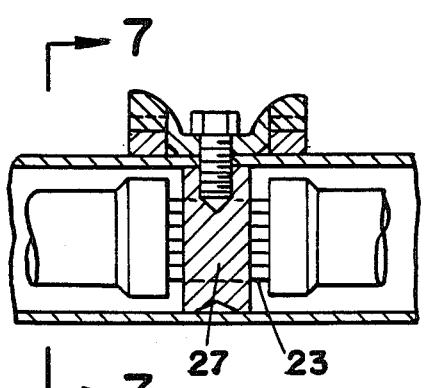
FIG_6
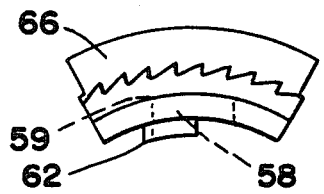
FIG_8
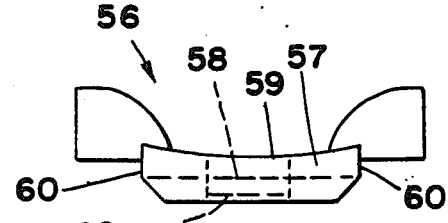
FIG_9
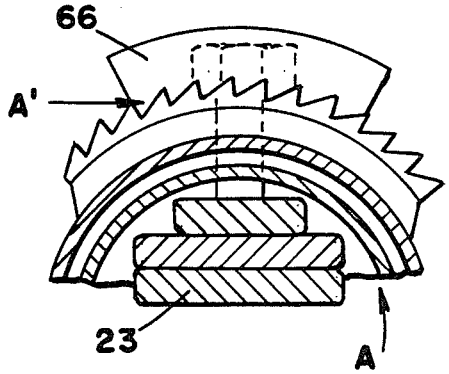
FIG_7
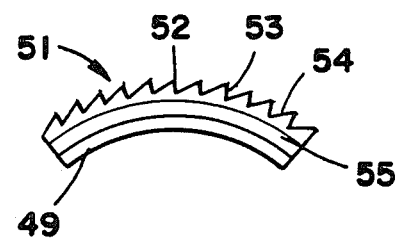
FIG_10

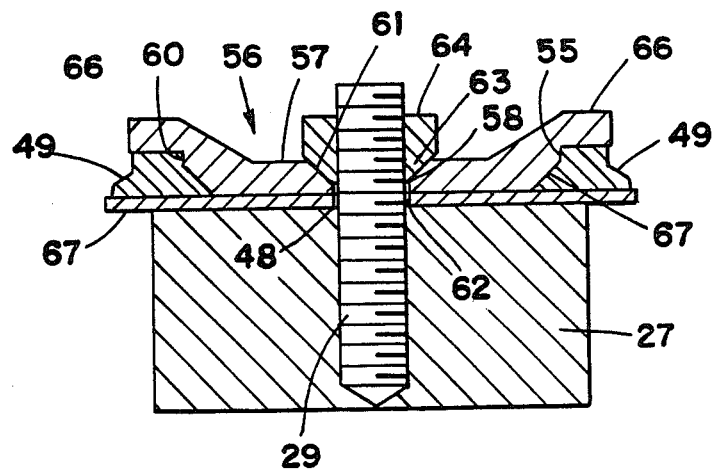
FIG_11
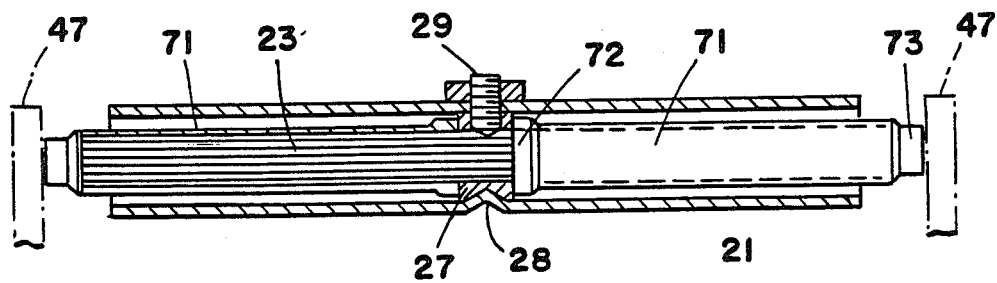
FIG_16
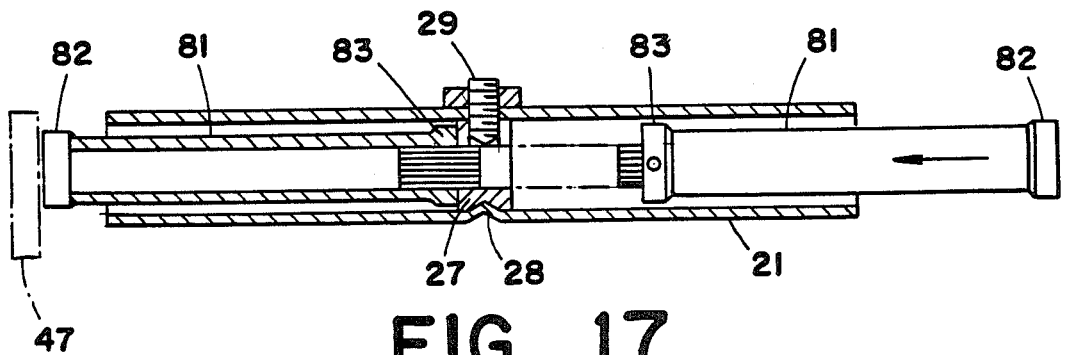
FIG_17

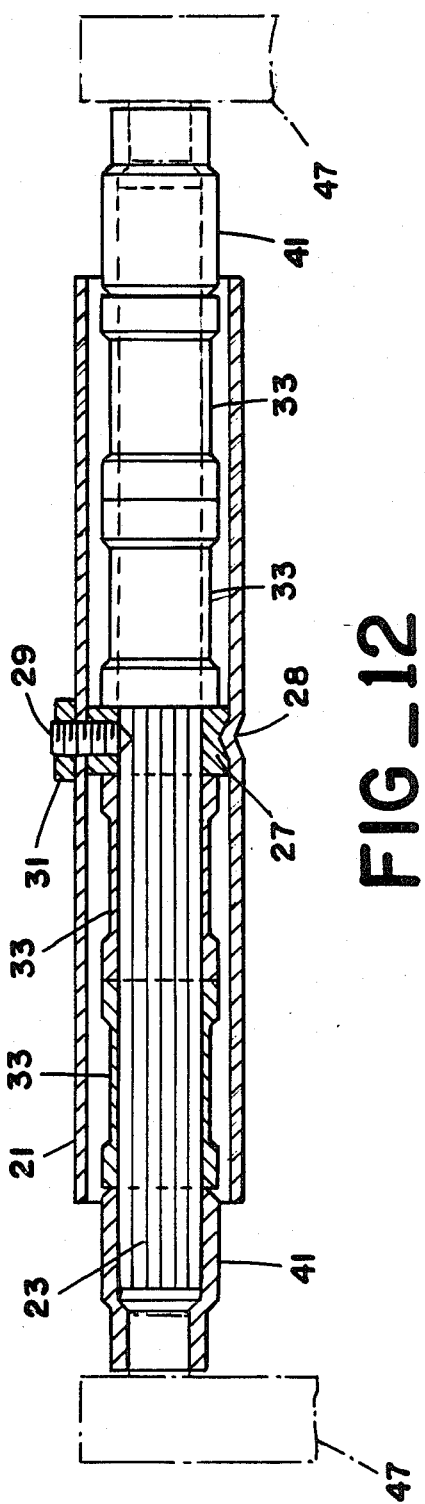
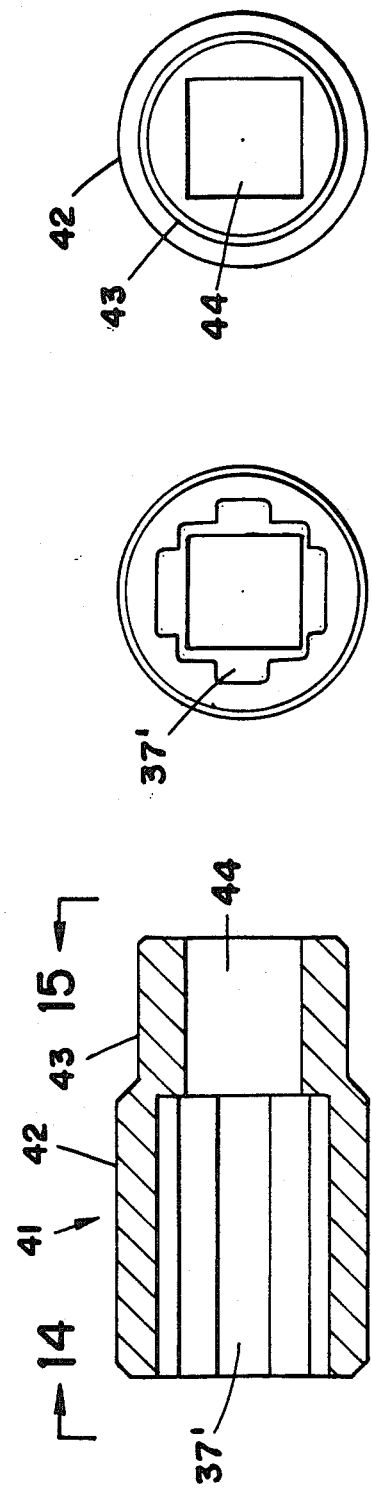

APPARATUS FOR ADJUSTMENT OF AUTOMOBILE TORSION BAR SUSPENSION ASSEMBLY

BACKGROUND OF THE INVENTION

It is often desirable or advisable to modify the suspension of an automobile, either for esthetic reasons or to improve the driving and road handling characteristics of the automobile. Likewise, modifying the body of an auto often requires that the suspension be modified to accommodate the new body features, and the new weight distribution caused by the body modifications. In prior art suspension systems which commonly employ leaf springs or coil springs, it is a relatively simple matter to substitute new springs, or new shock absorbers, to change the suspension system, in addition to changing the size and length of other suspension parts, by substitution, modification, and the like.

However, prior art suspension systems which employ torsion bar spring assemblies have presented unique obstacles to modification that have defied simple or cost-effective solutions. A typical torsion bar spring suspension, such as that provided as original equipment in Volkswagen automobiles and vans, includes at least one torsion spring composed of a plurality of spring leaves bundled together. The torsion spring is received within a tubular beam housing, and an internal mounting block secured in a medial portion of the beam housing rigidly secures the medial portion of the spring to the housing. The free ends of the torsion spring are joined to trailing arms or the like which extend to the respective wheels, so that deflection of the wheel caused by the weight of the vehicle and road shock is resiliently resisted by torsion of the spring.

In order to modify the torsion spring suspension assembly; e.g., to reduce clearance to the roadway or increase the spring force and "tighten" the ride, it is necessary to rotate the torsion spring(s) to adjust the nominal angle of the trailing arms which control the wheel spacing with respect to the vehicle body. This task has proved to be a formidable problem. The internal mounting block is firmly anchored in the beam housing by a set screw and portions of the beam housing wall peened into recesses in the mounting block, specifically for the purpose of preventing rotation of the torsion spring.

The torsion bar assembly can be removed from the internal mounting block and withdrawn from one end of the beam housing, but the mounting block remains within and requires that the torsion bar be reinserted at exactly the same angle. One approach to rotating the torsion spring involves cutting the beam housing circumferentially about either side of the internal mounting block, rotating the cutout section and the torsion spring that is still rigidly affixed thereto, and then rewelding and joining the cutout section in its new position. This restructuring of the beam housing can weaken the beam housing and lead to failure of the suspension, either immediately, or, more insidiously, after a period of normal use. Furthermore, in suspensions that employ two torsion springs in two beam housings, the upper beam is more easily modified in this way, and the lower beam is usually unchanged. As a result, the lower spring must bear a greater amount of torsional rotation and support a greater proportion of the vehicle weight, leading to uneven and excesive wear on the ball joints, trailing arms, and other related components.

In the two beam, two torsion spring suspension, if the lower beam is modified, there are further complications and problems. The lower beam secures the idler arm support box of the steering mechanism. First, it must also be cut off to achieve the desired rotation of the spring, and then rewelded in a new position angularly offset from its original placement. It is likely that the beam and the idler arm support box and its junction to the lower beam is weakened; if this support box becomes partially or totally detached, abrupt loss of directional control of the vehicle will result. The potential for catastrophic accident is obvious.

It should also be noted that the repositioned torsions springs are again secured in a fixed angular relationship relating to the respective beam housing, and there is no adjustment possible in the trailing arm angle and the height of the wheels with respect to the vehicle. Thus the process of cutout and rewelding must be performed perfectly, as there is no possibility of revising or readjusting the outcome.

An adjustable torsion bar suspension known in the prior art was produced in prototype form for the Porsche automobile. It featured a rotatable central mounting bushing, and a set screw extending from the bushing through a slot in the beam housing. However, the arrangement for securing the set screw to maintain the torsion beam angle included two lock nuts disposed atop a plate which engaged a toothed set plate. This construction was unstable and weak, and the height of the two lock nuts combined with the plate and set plate made this device too large to fit into the crowded area of the automobile suspension. Furthermore, this arrangement did not address the problem of altering the standard torsion bar assembly which is fixed in place by peened areas of the beam housing engaging depressions in the central mounting block.

Another approach to lowering the vehicle body (reducing road clearance) is to remove one or more of the leaves from the torsion spring bundle. This results in a reduced spring constant for the torsion springs, so that the vehicle weight caused greater flexure of the springs and allows the body to assume a lower nominal road clearance. However, the lower spring constant also provides a softer ride, so that road shock drives the wheels to undergo excessive movement. The wheels are thus liable to impact and interfere with the vehicle body.

It is clear that there is an unmet need in the prior art for an apparatus and approach to revise and modify the typical torsion bar suspension in a manner that is safe, economical, practical, and adjustable.

SUMMARY OF THE PRESENT INVENTION

The present invention generally comprises a method and an apparatus for enabling modification and adjustment of automobile torsion bar suspension assemblies which heretofore have been modifiable only through heroic measures. The torsion bar generally comprises a bundle of spring leaves permanently secured in a tubular beam housing. The present invention enables adjustment of the spring constant of the torsion bar, rotation of the torsion bar to alter the angle of the trailing arm assemblies that control the wheel spacing from the road and the vehicle body, and adjustability of the angle of the torsion bar to selectively alter the suspension characteristics.

The apparatus of the invention includes a plurality of torsion spring stiffener members, each comprising a tubular member dimensioned to be slidably received about the torsion leaf spring assembly within the beam housing. The tubular member includes opposed end portions provided with an inner peripheral surface formed complementary to the outer surface conformation of the leaves of the torsion bar assembly and adapted to engage the leaves assembly in non-rotating fashion. The stiffener member acts to rotationally immobilize a segment of the length of the torsion leaf assembly, thereby increasing the overall stiffness of the torsion spring. The invention also includes a socket tool having a recess in one end formed in complementary fashion to the outer surface conformation of the torsion leaf assembly and adapted to be engaged thereon. The other end of the socket tool is provided with a receptacle adapted to receive a standard drive lug of a torque wrench. Alternatively, an elongated tool having an inner end formed in complementary fashion to the outer surface conformation of the torsion leaf assembly, and an outer end socket tool receptacle, is secured at each end of the torsion leaf assembly. In another alternative embodiment, the torsion bar assembly is removed from the beam housing, and an elongated tool having an inner end with an outer surface formed in conformance with the torsion bar is inserted into the beam housing and into the internal bushing which supports the torsion bar.

In the method of the present invention, a plurality of stiffener members are secured to the torsion leaf assembly to substantially eliminate any spring torsion, and a socket tool is secured to each end of the leaf assembly. Alternatively, an elongated tool is secured to each side of the torsion bar, extending to the internal bushing. Torque is applied to the socket receptacles or elongated tools in sufficient amount to forcibly free the internal bushing or block which rigidly secures the torsion leaf assembly in the beam housing. A partial circumferential slot is then routed in the beam housing adjacent to the internal block, and a pair of toothed locking plates are welded to the beam housing adjacent to the slot. A mounting screw secured to the internal block extends through the slot, and a top plate is secured to the screw. The top plate includes complementary teeth to engage the locking plates and enable rigid mounting of the internal block and torsion leaf assembly at variable angles with respect to the beam housing, thus selectively setting the height of the auto suspension.

BRIEF DESCRIPTION OF THE DRAWING

FIG. 1 is a perspective view of the critical components of an exemplary torsion bar suspension, shown modified in accordance with the present invention.

FIG. 2 is a partially cutaway plan view of a torsion bar stiffener of the present invention.

FIG. 3 is a cross-sectional view of the torsion bar stiffener, taken along line 3—3 of FIG. 2.

FIG. 4 is a cross-sectional view of the torsion bar stiffener, taken along line 4—4 of FIG. 2.

FIG. 5 is an enlarged perspective view of the torsion bar adjustment mechanism of the present invention.

FIG. 6 is a cross-sectional elevation of the torsion bar adjustment mechanism shown in FIG. 5.

FIG. 7 is a cross-sectional end elevation of the torsion bar adjustment mechanism, taken along line 7—7 of FIG. 6.

FIG. 8 is an enlarged side view of the engagement of the adjustment teeth of the torsion bar adjustment mechanism.

FIG. 9 is a front end elevation of the top plate component of the torsion bar adjustment mechanism.

FIG. 10 is a side elevation of a locking plate for securing the top plate of the torsion bar adjustment mechanism.

FIG. 11 is an enlarged, detailed cross-sectional view of the adjustment mechanism.

FIG. 12 is a cross-sectional view of the torsion bar modifying apparatus of the invention, shown assembled to a torsion bar.

FIG. 13 is a cross-sectional elevation of the torsion bar socket tool of the present invention.

FIG. 14 is a cross-sectional view of the torsion bar socket tool, taken along line 14—14 of FIG. 13.

FIG. 15 is a cross-sectional view of the torsion bar socket tool, taken along line 15—15 of FIG. 13.

FIG. 16 is a cross-sectional view of a further embodiment of the present invention, showing an elongated tool to free the internal bushing of the torsion bar assembly.

FIG. 17 is a cross-sectional view of another embodiment of the present invention, showing an elongated tool used to free the internal bushing of the torsion bar when the torsion bar is first removed.

DESCRIPTION OF THE PREFERRED EMBODIMENT

The present invention generally comprises an apparatus and method for modifying and adjusting an automotive suspension that includes a torsion bar spring component. With regard to FIG. 1, one common example of a torsion bar suspension, used in Volkswagen vehicles and the like, includes a pair of parallel, tubular beam housings 21 and 22, each enclosing a torsion bar 23. Each torsion bar is comprised of a plurality of parallel spring leaves joined in a bundle. A pair of frame support members 24 extend from the vehicle frame in laterally spaced fashion, and the beam housings extend through the support members 24 and are welded thereto. A quartet of torsion arms (trailing arms) 26 are also provided, each secured at one end to a free end of a torsion bar 23 and at the other end to a steering knuckle which supports a groundengaging wheel. It may be appreciated that displacement of the vehicle wheels by vehicle weight and road shock causes the arms 26 to rotate about the axes of the torsion bars 23 and torsionally load the bars 23.

Each torsion bar 23 includes a medial segment which is secured rigidly within its respective beam housing by an internal bushing block 27, as shown in FIG. 12. The bushing 27 comprises an annular member with a central passage therethrough having a peripheral configuration complementary to the outer surface configuration of the torsion bar leaf bundle. The outer surface of the bushing 27 includes spaced recesses to receive and be engaged by portions 28 of the beam housing which are peened or otherwise driven into the recesses to immobilize the bushing within the beam housing. In addition, a set screw 29 extends through a hole in the beam housing and is received in a tapped hole in the bushing 27. The set screw impinges on the torsion bar, and further rigidifies the assembly, and prevents axial removal of the torsion bar. A lock nut 31 secures the set screw 29.

Due to the fixed angular orientation of the bushing 27, it is not possible to rotate the torsion bar 23 and thus change the nominal angles of the trailing arms 26 to alter the suspension height and stiffness. Even though removal of the set screw 29 will permit axial withdrawal of the torsion bar, the bar must be reinstalled at precisely the same angle as before. Thus it is critical to be able to rotate the bushing 27 to alter the suspension in any meaningful manner. The method and apparatus of the present invention are particularly designed to achieve this result with a minimum of effort and alteration to the existing suspension components.

With regard to FIG. 2, one component of one embodiment of the present invention comprises a spring stiffener 33. The spring stiffener 33 includes a rigid tubular body 34, and a pair of end rings 36 rigidly joined in concentric alignment to the opposed ends of the tubular body. The maximum outside diameter of the body 34 and end rings 36 is less than the interior diameter of the beam housing. The end rings 36 are each provided with a bore 37 extending therethrough, the bore 37 having an internal surface configuration complementary to the exterior surface conformation of the torsion spring leaf bundle. (This conformation is generally standard for each automobile manufacturer.) The end rings 36 thus grip the torsion bar assembly in non-rotatable fashion, although there is sufficient clearance to slide the spring stiffener along the torsion bar. The rigid tubular member 34 assures that the pair of end rings 36 cannot rotate with respect to each other. As a result, the segment of torsion bar onto which the spring stiffener 33 is slidably secured is rotationally rigidified, and cannot contribute to the torsional flexure of the torsion bar assembly. The effective length of the torsion spring is reduced by the spring stiffener, and the stiffness of the spring is increased.

Another significant component of the present invention is a torsion bar socket tool 41, shown in FIGS. 13-15. The socket tool 41 includes a cylindrical body 42 having a bore 37' extending therethrough, the bore 37' having the same configuration and purpose as the bore 37 described previously. The socket tool also includes a cylindrical neck portion 43 extending concentrically from the body 42, with a socket 44 extending into the end thereof. The socket 44 may comprise a square receptacle or the like of standardized size to receive a drive lug of a torque wrench. It may be appreciated that the socket tool 41 may be secured to an end of a torsion bar, using the bore 37', and that the socket receptacle may be joined to a driving wrench to apply torque to the torsion bar assembly.

The method used in conjunction with this embodiment employs a plurality of spring stiffener members 33 and a plurality of torsion bar socket tools 41 to accomplish one of the tasks required to modify the suspension: to free the bushing 27 so that the torsion bar may be rotated. The first step is to dismantle the suspension sufficiently to expose the ends of a torsion bar 23. As shown in FIG. 12, a plurality of spring stiffener members is then slidably secured on both ends of the torsion bar, within the beam housing, so that substantially the entire length of the spring is rotationally immobilized. Approximately two inches of the ends of the torsion bar remain exposed. (It should be noted that the number of spring stiffener members required depends on their individual length.) Next, a pair of socket tools 41 are assembled on the opposed, exposed ends of the torsion bar, and a pair of torque wrenches are secured to the socket tools 41.

It may be noted that the temporarily rigid torsion bar transmits all torque applied to the ends thereof directly to the internal bushing 27. After the set screw 29 is removed, all torque is opposed by the engagement of the peened portions 28 holding the bushing in place. When high torque is applied simultaneously by both wrenches 47, on the order of 1500 ft-lbs, sufficient force is exerted on the bushing 27 to drive the peened portions 28 outwardly, rotating and freeing the bushing from its mounting within the beam housing 21. It may be appreciated that this result cannot be obtained without first immobilizing the torsion bar with the spring stiffeners; otherwise, the flexure of the spring prevents direct application of sufficient force to the bushing to free the bushing.

In an alternative embodiment of the invention, shown in FIG. 16, the plurality of spring stiffeners and the socket tool is replaced by a single, elongated tubular tool 71. The tubular body of the tool 71 is dimensioned to be received within the beam housing 21 and about the entire extent of the torsion bar assembly 23 from the bushing 28 to one end of the assembly 23. The inner end 72 of the member 71 is formed similarly to the portion 36-37 of the spring stiffener 33, and is adapted to engage the torsion bar assembly in like fashion. The outer end 73 of the member 71 is formed similarly to the end portion 43-44 of the socket tool 41, and is adapted to be engaged by a torque tool 47. Thus a member 71 may be secured to each end of the torsion spring leaf assembly 23, with the portions 72 engaging the torsion bar directly adjacent to the bushing 27. As described previously, sufficient torque is then applied to both tools 71 by the torque wrenches 47 to free the bushing 27 from the peened portions 28.

In a further embodiment of the invention, shown in FIG. 17, an elongated tool 81 is provided to rotate the bushing 27. In those situations in which it is easier to first remove the torsion bar by loosening the set screw 29 and sliding the bar longitudinally out of the beam housing, this task is first performed. The tool 81 includes an outer end receptacle 82 adapted to engage a torque applying tool. It also includes an inner end having a portion extending axially from the end thereof and formed with an outer surface conformation identical to the torsion bar that was removed, or a conformation that otherside can engage the bore of the bushing 27 in torque applying fashion. A pair of tools 81 are provided, each inserted in one end of the beam housing with the ends 83 thereof engaged in the bore of the bushing 27. Sufficient torque is then applied to the tools 81 to free the bushing within the housing, as described previously.

To free the bushing 27 in the lateral direction, one of the tools 71 or 81 (or the stiffeners and socket tools assembled thereto of the previous embodiment) is then struck at one end with a hammer, driving the assembly in the axial direction. This process is repeated until the bushing 27 is clear of the set screw hole in the beam housing. The existing set screw hole is then used to initiate a slot 48 which is routed in the beam housing. The slot 48 extends in a partial circumferential segment; the angular extent of the slot 48 determines the absolute number of degrees of rotation adjustment of the torsion bar that will be available after reassembly. In the preferred embodiment the slot extends approximately 30° to provide sufficient adjustment while retaining the strength of the beam housing.

The apparatus of the present invention also includes a unique adjustment mechanism which secures the bushing 27 and the center of the torsion bar at any desired angular setting within the limits of the slot 48. A significant feature of the adjustment mechanism is that it does not protrude from the beam housing any more that the original equipment set screw 29, thus avoiding interference with adjacent gear shift, steering and suspension components. As shown in FIG. 5, the adjustment mechanism includes a pair of locking plates 49, each comprising a gear rack having an annular conformation of the beam housing surface and adapted to be secured thereto. The locking plates are adapted to be welded to the beam housing surface, positioned on either side of the slot 48 and reinforcing the beam housing. The outer surface of the locking plates is provided with an array of teeth 51, as shown in FIG. 10. Each of the teeth 51 includes a crest 52 extending generally parallel to the axis of the torsion bar, and a leading edge 53 disposed in a plane passing through the torsion bar axis. The trailing edge 54 of each tooth extends obliquely from the crest to the root of the adjacent tooth.

Another significant component of the adjustment mechanism is the top plate 56, shown in FIGS. 5–9 and 11. The top plate 56 includes a central web portion 57 which is curved in conformance with the outer surface of the beam housing and is adapted to impinge thereon. A hole 58 extends through the center of the portion 57 to receive the set screw 29, and the outer surface of the portion 57 includes a planar annular surface 59 to engage a lock nut received on the outer end of the set screw. With regard to FIG. 11, the upper portion of the screw hole 58 is beveled at approximately 45°, and an offset, semi-annular flange 62 extends inwardly from the periphery of the hole 58 to be received within the slot 48. The flange 62 provides further support area in contact with the set screw, without requiring a widened slot 48. A new lock nut 63 is also provided to be assembled to the set screw, the nut 63 including a beveled annular lower surface 64 adapted to mate with the bevel 61 of the top plate. This beveled engagement centers the set screw in the hole 58, and prevents eccentric alignment of the screw as the nut is tightened.

A salient feature of the top plate is the provision of a pair of laterally opposed arms 66 extending in the axial direction from the medial web 57. The arms 66 extend obliquely outwardly to establish clearance for the locking plates 49. At their lateral extremities, the inner surfaces of the arms 66 are provided with annular gear rack segments formed in complementary fashion to the locking plates 49 and the teeth 51. The engagement of the teeth of the locking plates and the arms 66 is designed to oppose the torque (indicated by arrow A in FIG. 7) applied to the spring by the vehicle weight and road shock. That is, the teeth surfaces 53 impinge on the like surfaces of the top plate arms, blocking rotation of the top plate and movement of the torsion bar. More specifically, the torsional force A' applied to the top plate through the set screw 29 is rigidly opposed by the mating of the teeth surfaces 53 of the locking plate and top plate. The teeth of the top plate, due to their wedge shape and the fact that their wedge shape is angled to converge toward the torque direction A', tend to "dig in" to the opposed, mating gear teeth. In particular, the top plate teeth disposed rearwardly of the set screw (with respect to the forward torque A') are pulled into engagement with the mating teeth of the members 49, so that any torque A' will maintain the top plate locked in place, even if the lock nut 63 is removed.

It should be noted that each of the arms 66 are also provided with a beveled inner surface 67 to establish clearance for the weldment that joins the respective adjacent locking plate to the beam housing. The top plate is provided with vertical surfaces 60 at opposed ends of the central web 57 (FIGS. 9 and 11), and the locking plates 49 are provided with complementary, confronting vertical surfaces 55 (FIGS. 5 and 10). The locking plates are spaced apart so that there is virtually no free play between the confronting surfaces 55 and 60, and their engagement serves to prevent lateral movement of the top plate due to lateral forces applied from the torsion bar through the set screw 29 to the top plate 56. The surfaces 55 and 60 are spaced farther from the beam housing in the radial direction than the web 57, so that lateral forces applied to the web by the set screw will not urge the top plate to "roll" up out of its disposition between the members 49.

In this regard, the flange 62 eliminates any unsupported length of the set screw 29, further preventing lateral motion of the top plate and torsion beam without requiring a wider slot 48. Furthermore, the top plate is dimensioned so that the web portion 47 impinges on the surface of the beam housing before th teeth of the top plate and the locking plates become wedged together and mechanically frozen. This relationship provides further frictional detent action when the nut is tightened or when torque A' is increased. Thus it is always an easy process to adjust the suspension by removing torque A', loosening and removing the lock nut, lifting off the top plate, repositioning the torsion bar spring by moving the set screw in the slot 48, and then reinstalling the top plate and lock nut in the new position.

Returning to the method of the present invention, after the slot 48 is routed in the beam housing, the torsion bar assembly with the spring stiffeners and the socket tools (or the elongated tools 71 or 81) is struck with a hammer again in the opposite direction to move the bushing 27 and return it to its original position. The set screw 29 is then threaded back into its hole in the bushing. The two locking plates 49 are positioned on the exterior of the beam housing adjacent to the slot 48, the top plate is placed with the set screw extending through the hole 58, and the lock nut 63 is secured to the set screw to compressively hold the top plate and locking plates in place. The axially opposed end surfaces of the locking plates 49 are then welded to the beam housing. The lock nut and top plate are then removed, and the axially confronting surfaces of the locking plates are welded to the beam housing. The top plate 56 is then reinstalled on the set screw with the lock nut 63 to set the position of the set screw 29, bushing 27, and torsion bar 23 at a selected angle to establish the desired height of the automobile suspension.

The spring stiffeners 33 and the socket tools 41 (or the long tools 71 or 81) may then be removed from the torsion bar, the method is repeated for the other torsion bar, and the suspension is reassembled. It should be noted that one or more pairs of the spring stiffeners may be used to stiffen each torsion bar and provide a firmer, "tighter" ride. Although the spring stiffeners are dimensioned to slidably engage the torsion bar when it is unloaded, torsional loading of the torsion bar prevents movement of the spring stiffener in the axial direction. Thus, for example, a pair of spring stiffeners may be placed on the torsion bar at either side of the bushing, after any suspension modifications have been completed. After the suspension is reassembled and it is bearing the vehicle weight, the torsion on the torsion bars will secure the spring stiffeners in place. This modification of the spring stiffness may be accomplished with or without the other modifications to the suspension described herein. Likewise, the torsion bar socket tool of the present invention may be employed to rotate or torsionally load a torsion bar for any other sort of suspension modification or adjustment.

It should be noted that in the description of torsion bar assemblies in the preceding specification, only one configuration of spring lead assembly has been shown for purposes of example only. However, it is understood that differing vehicles employ various configurations of spring leaf assemblies to form a torsion bar, and that the members adapted to engage the torsion bar in rotationally fixed relationship may be provided with appropriate openings or receptacles for these different conformations.

I claim:

1. A spring stiffener device for a torsion bar, including a tubular body member having a passage extending axially therethrough dimensioned to be received about a segment of said torsion bar in sliding, sleeve-like fashion; a pair of end portions secured fixedly at opposed ends of said tubular body member, each end portion including an opening extending axially therethrough, each opening having peripheral surface means adapted to engage the outer surface of an annular segment of the torsion bar in rotationally fixed, axially sliding relationship to rotationally immobilize said segment of said torsion bar.

2. The spring stiffener device of claim 1, wherein said peripheral surface means includes inner surface portions of said opening formed in a configuration complementary to said outer surface of an annular segment of the torsion bar.

3. The spring stiffener device of claim 2, wherein said inner surface portions of said openings are spaced with respect to said annular segment outer surface to establish clearance therefrom sufficient to permit sliding fit in sleeve-like fashion when the torsion bar is in its linear, unloaded disposition, and to frictionally engage the torsion bar in axially nonmovable fashion when it is in its torsionally rotated, loaded disposition.

4. An adjustable locking mechanism for securing a torsion bar within a beam housing, comprising;
a bushing secured fixedly about a medial portion of said torsion bar, said bushing being rotatably received within said beam housing;
a slot extending through said beam housing and disposed in confronting relationship to said bushing, said slot oriented along a partial circumferential path;
a pair of locking plates secured to said beam housing in opposed, spaced apart relationship on both sides of said slot;
a post member extending radially outwardly from said bushing and through said slot in freely translating fashion;
a top plate adapted to be received between said locking plates and removably secured to said post member, said top plate including a hole adapted to receive said post member therethrough;
gear teeth means disposed on the outer surfaces of said locking plates and the axially opposed end portions of said top plate for intermeshing and securing said top plate and said post member at a desired position along said slot and maintaining said bushing and the torsion bar at a corresponding desired angle with respect to said beam housing.

5. The adjustable locking mechanism of claim 4, wherein said gear teeth means includes an array of first gear teeth extending along each of said locking plates and oriented generally radially outwardly from said beam housing, and corresponding second gear teeth formed in said locking plate and extending generally radially inwardly to engage said first gear teeth.

6. The adjustable locking mechanism of claim 5, wherein said first and second gear teeth are each defined primarily by paired, converging planar gear teeth surfaces extending parallel to the axis of the torsion bar and beam housing.

7. The adjustable locking mechanism of claim 6, wherein one of said paired converging planar gear teeth surfaces extends generally radially outwardly from said beam housing to engage a complementary, like-formed surface of the confronting second or first gear teeth.

8. The adjustable locking mechanism of claim 7, wherein the other of said paired converging planar gear teeth surfaces extends acutely from the respective one of said gear teeth surfaces to define a wedge shape, said wedge shape being oriented to engage the complementary, like-formed surface of the confronting second or first gear teeth with increasing resistance to torque applied by said torsion bar as said torque is increased.

9. The locking mechanism of claim 4, wherein said locking plates include annular, confronting first surfaces extending generally orthogonally to said beam housing and transverse to the axis thereof, and said top plate includes complementarily formed annular second surfaces at opposed ends thereof, said first surfaces being spaced to engage said second surfaces in close fit and prevent movement of said top plate axially along said beam housing.

10. The locking mechanism of claim 9, wherein said first and second surfaces are spaced farther from the beam housing in the radial direction than the portion of said top plate which includes said hole for said post member.

* * * * *